Figure 4:
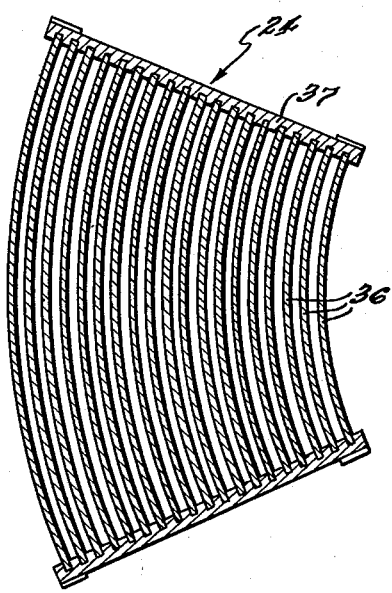

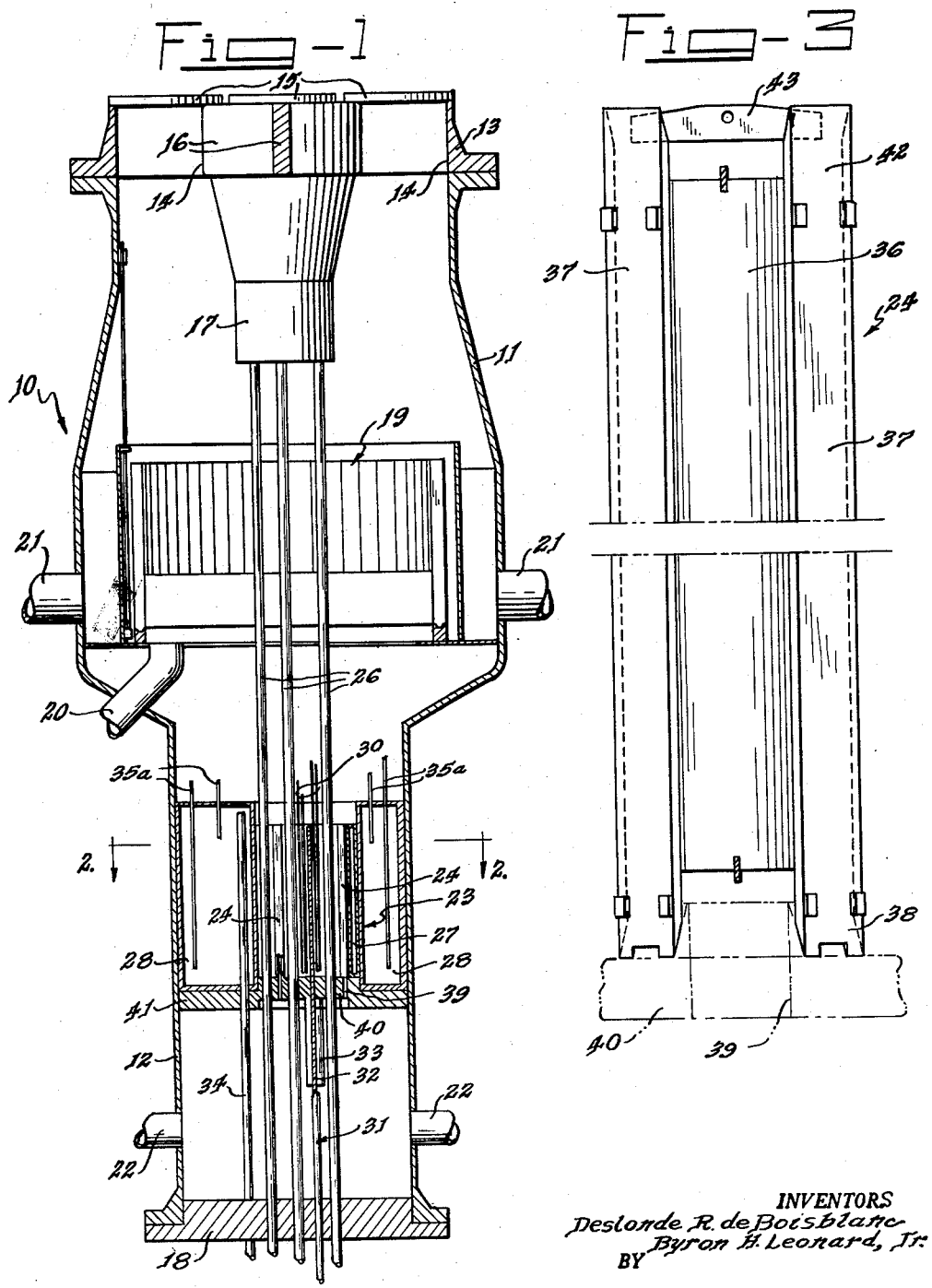

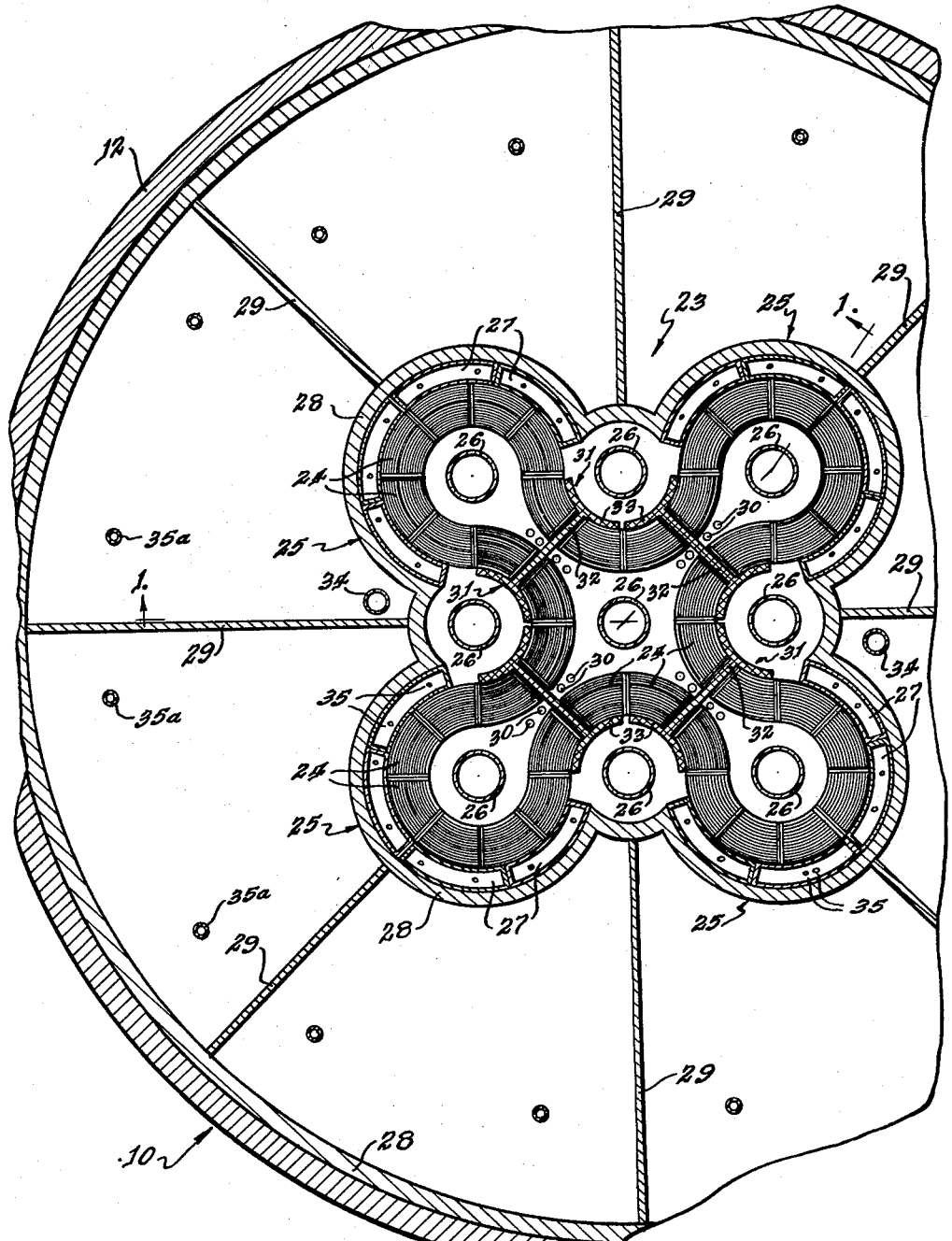

Sept. 15, 1964  D. R. DE BOISBLANC ETAL  3,149,044
ADVANCED TEST REACTOR

Filed April 13, 1961  3 Sheets-Sheet 3

INVENTORS
Deslonde R. de Boisblanc
Byron H. Leonard, Jr.
BY
Roland A. Anderson
Attorney United States Patent Office 3,149,044
Patented Sept. 15, 1964

3,149,044
ADVANCED TEST REACTOR
Deslonde R. de Boisblanc, Idaho Falls, Idaho, and Byron H. Leonard, Jr., University City, Mo., assignors to the United States of America as represented by the United States Atomic Energy Commission
Filed Apr. 13, 1961, Ser. No. 102,901
9 Claims. (Cl. 176—18)

The present invention relates to nuclear reactors and to methods for their control. In more detail the invention relates to a very high-flux research reactor having high internal neutron leakage. In still more detail the invention relates to a research reactor including regions which may be operated at different power levels and different flux spectrums.

There is a continuing large demand for test space in high-flux nuclear reactors because maximum effect on irradiated material can be obtained in such reactors in the shortest possible time. Although theoretically any thermal neutron flux can be obtained from a thermal reactor, cost considerations connected with initial construction, fuel burnup and fuel reprocessing and heat transfer considerations place a very definite limit on the thermal flux obtainable in a reactor.

It has been shown that a maximum thermal flux can be obtained in a nuclear reactor in a flux concentration region known as a flux trap. A flux trap is a volume of moderator which is surrounded by a shell of fissionable material. The theory of the flux trap was discussed by W. K. Ergen in paper No. 628 at the Second International Conference on the Peaceful Uses of Atomic Energy which is reported in vol. 10 of the Proceedings thereof at pages 181–184. According to the present invention a reactor design is presented which has high internal leakage into a plurality of experimental locations which thereby constitute flux traps.

In all research reactors, it is desirable that different materials be irradiated in different experimental locations for different purposes at the same time. It may be that the magnitude of the flux and the flux spectrum to be used in irradiating different materials would be different, in fact so different that they could not be irradiated simultaneously in an existing research reactor. According to the present invention a reactor design is presented wherein several experimental samples can be simultaneously tested at different absolute flux levels and different fast-to-thermal flux ratios.

It is accordingly an object of the present invention to develop a nuclear reactor providing a spatially-uniform, time-independent neutron flux of approximately $10^{15}$, both fast and thermal, in a multiplicity of experimental locations.

It is a further object of the present invention to develop a nuclear reactor including a plurality of experimental locations which are particularly suitable for cylindrical experiments.

It is also an object of the present invention to develop a nuclear reactor having high internal leakage into a plurality of flux traps.

It is another object of the present invention to develop a nuclear reactor incorporating a large number of experimentation locations which can be operated at different neutron fluxes and with different neutron spectrums.

It is still another object of the present invention to develop a nuclear reactor in which the power level of different portions of the reactor can be varied.

These and other objects of the present invention are attained by a reactor constructed according to the present invention which includes fuel elements arranged in serpentine configuration to form a plurality of over one-half complete right cylindrical shells which are connected by fuel elements arranged to form less than one-half complete right cylindrical shells resulting in a high leakage core having reentrant core geometry. A reactor having a large number of flux trap test spaces of small diameter having a close approximation to a cylindrical distribution of fuel thereabout results thereby.

The preferred embodiment of the present invention comprises a reactor having a quatrefoil core configuration which has nine flux trap test spaces—one in each lobe of the quatrefoil, one at the center of the quatrefoil, and one between each pair of lobes. Controllable power distribution between separate lobes is obtained by chemical shim controls just outside each lobe and in the neck region of each lobe.

Figure 5:
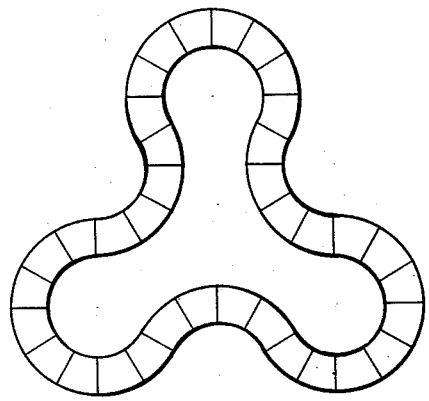
Figure 6:
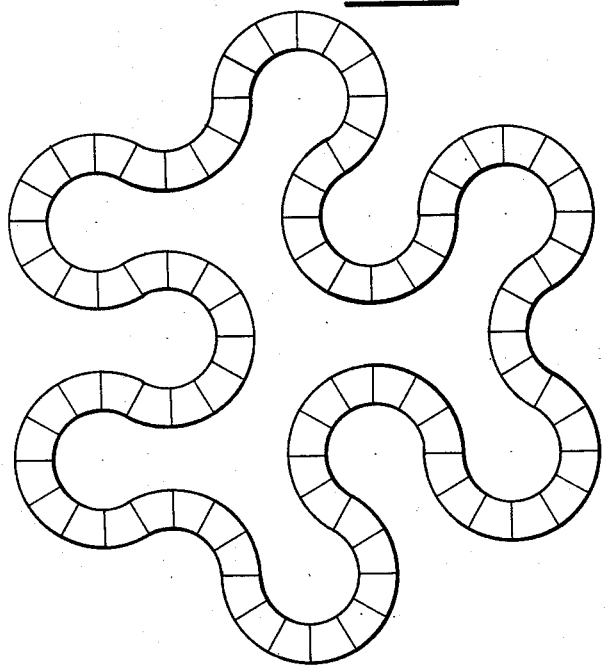

The invention will next be described in connection with the accompanying drawing wherein:

FIG. 1 is a vertical sectional view of a nuclear reactor according to the present invention, FIG. 2 is a horizontal sectional view taken in the direction of the arrows 2—2, FIG. 3 is a front elevational view of a fuel element for the nuclear reactor, FIG. 4 is a vertical sectional view of the fuel element, FIG. 5 is a schematic view of a modified form of core geometry, and FIG. 6 is a schematic view of another modified form of core geometry.

As shown in FIG. 1, the nuclear reactor according to the present invention has a stainless steel pressure vessel 10 including an upper section 11 which is about 12 feet in diameter at its widest point and a lower section 12 which is approximately 6 feet 9 inches in diameter. The total height of the pressure vessel is 32 feet. The pressure vessel 10 is provided with a top head 13 which is fabricated in the form of a large spider. Top head 13 contains four fuel ports 14 for access into the vessel, each of which is provided with a cover 15. The hub 16 of top head 13 contains experimental loop facility penetrations and includes a shield 17 to protect personnel from radiation from experiments contained in the loops. Pressure vessel 10 is also provided with a bottom head 18 containing penetrations for control elements and experimental loops. In addition, as is conventional in the art, a thermal shield (not shown) is provided outside the pressure vessel 10. A rotary fuel rack 19 is provided in upper section 11 of the pressure vessel. By means of rotary fuel rack 19, fuel elements can be passed around the reactor to a discharge chute 20. Cooling water is admitted to pressure vessel 10 through two cooling water inlet lines 21 and leaves the pressure through four coolant water exit lines 22 in lower section 12 of the pressure vessel.

Core 23 of the nuclear reactor is disposed in the lower section 12 of the pressure vessel. As is apparent from FIG. 2, core 23 comprises a plurality of fuel elements 24 which are arranged in the form of a quatrefoil in which the fuel elements 24 in each lobe 25 of the quatrefoil are arranged in a smooth curve forming more than a 180-degree segment of a circle. Passing through the center of each lobe, the center of the quatrefoil and between each pair of lobes are stainless steel 2-inch pipes 26 which extend the entire length of the reactor and penetrate the top and bottom heads 13 and 18. These pipes are known in the art as loops and are the experimental loops previously mentioned.

The use of loops penetrating the top cap of the reactor vessel and running straight and vertically through the reactor core results in a high degree of accessibility of the exterior portions of the experiments and offers very convenient handling and discharge of experiments. The nine loops contained in this reactor are very nearly the optimum number. The number is large and yet not so large that reactor down time caused by failure of experiments in the loops is unduly high.

Located just outside of each of the lobes 25 of the reactor core 23 are four arcuate tanks 27 designed to contain in solution a material having a high capture cross section for thermal neutrons such as a solution of boric acid in light water for use as shim control. Tanks 27 are ½ inch thick in inside width and extend 230 degrees around lobes 25. Pipes 35 are provided for filling and emptying arcuate tank 27 and adjusting the concentration of boric acid therein. Arcuate tanks 27 are divided into four sections to allow differential control of reactivity imbalances from the experiments, to effect power balancing during reactor operation and to allow special distribution of power among the four lobes to achieve a special combination of flux levels. Located between the core and the pressure vessel is a reflector tank 28 designed to contain heavy water as the reflector. Ribs 29 are provided in reflector tank 28 to strengthen it and pipes 35a are provided to fill and empty it. In the neck of each lobe 25 in the reactor are four ½ inch vertical tubes 30 designed to contain a solution of boric acid in water or similar material to serve as further shim control.

For the removal of boron from the control solutions, a boiler–$H_3BO_3$ recovery system is used. The recovery system stores a portion of borated $H_2O$ withdrawn from the control tanks 27 and tubes 30 and distills off the $H_2O$ as a batch process. The high $B^{10}$ content boric acid is then recovered and stored in makeup tanks. If standard boric acid were used, an ion-exchange system would be feasible for removal of boron and radioactive products. In this event boric acid recovery would be needed as the amounts used during each cycle would be quite small.

For addition of the boron to the system, an injector places a metered amount of 130° F. 100 g. $H_3BO_3$/liter solution into the main $H_2O$ stream just prior to entrance into the control tank region. The operating temperature and pressure of the control solution are about 150° F. and 300 p.s.i.g.

As shown in FIG. 2, a safety control 31 in the form of a blade 32 extending between the midpoints of arcuate extensions 33 is disposed transversely to the neck of each lobe 25 and extends completely thereacross. Each arcuate extension is disposed along the shorter curved sides of two fuel elements 24 at opposite sides of the blade 32 and directly adjacent thereto. Shim control tubes 30 are symmetrically disposed about blade 32. Safety control 31 is made of a material having a high capture cross section for neutrons such as cadmium and is always completely withdrawn when the reactor is operating. Conventional regulating rods 34 are provided in the reflector tank 28 just outside the reactor core. Safety controls 31 and regulating rods 34 are driven from below.

Fuel elements 24 are shown in more detail in FIGS. 3 and 4. Fuel elements 24 contain a plurality of curved plates 36 mounted between two side plates 37 to form a 45-degree segment of a right circular cylinder. Each element has 19 curved plates 36, 0.050 inch thick, mechanically joined to the side plates. Each fuel plate 36 consists of a homogeneous, 93%-enriched, 33 wt. percent uranium–65 wt. percent aluminum alloy core 0.020 inch thick completely clad with a 0.015-inch layer of aluminum-nickel alloy. The over-all length of the plates 36 is 49.5 inches. Boron may be incorporated in the fuel alloy as a burnable poison. The inside radius of the fuel element 24 is 3 inches and the outside radius is 5.5 inches. Side plates 37 are extended below the fuel plates 36 to form a bottom end box 38 which is aligned with openings 39 in a bottom grid 40. Bottom grid 40 and the reflector tank 28 and control tank 27 are supported by a support member 41. At the top of the fuel element 24 the side plates 37 are extended to form a top end box 42. The extensions of the side plates 37 are tied together by strap 43.

The flux spectrum or ratio of fast to thermal neutrons within each test space may be varied from that obtained when pure water is present in the annular space surrounding the test loops by inserting aluminum filler pieces in one or more of such locations. By reducing the amount of moderator surrounding the test spaces the fast flux can be increased and the thermal flux decreased. By having water only surrounding some test loops and water plus aluminum surrounding others, different flux spectrums can be obtained in different test loops.

While the preferred embodiment of the invention represents a quatrefoil arrangement of the fuel elements, other arrangements fall within the scope of the invention. A trefoil arrangement of the fuel elements is shown schematically in FIG. 5 and a six-lobe arrangement is shown in FIG. 6.

Reflector and neck shim controls 27 and 30 are used to adjust the initial power distribution among the core lobes and to maintain it during operation. This control is one of the more important aspects of the present invention. It is possible according to the present invention to carry on experiments in different lobes of the reactor at different power levels. This is accomplished by the shim control system constituting the borated-water-filled control tanks 27 and control tubes 30. The worth of a reflector shim control system consisting of four ½-inch thick quarter annuli extending about 230 degrees around each core lobe is 7% $\Delta k/k$ from clean water to a content of 50 grams of boric acid containing natural boron per liter. The neck shim controls have a worth of 4.3% $\Delta k/k$ from clean water to 50 grams of boric acid per liter. The neck shims are used largely to produce an outward power shift counteracting the effect of the reflector so that control of the power distribution can be maintained during the cycle.

The present reactor employs chemical shim control to preserve at least a cosine vertical distribution of flux throughout each cycle of operation. Chemical control is more advantageous than mechanical control because variations in test conditions are inherent in conventional mechanical controls and rather complicated mechanical controls requiring considerable development would be necessary for equivalent results. Also since space in the necks of the lobes is limited it would be difficult to fit mechanical shim controls into the neck regions without serious interference with the safety controls.

The following table gives the available fluxes at the various test locations at a reactor power of 250 mw. In this table the outer positions are in the lobes while the exterior positions are between lobes.

*Average Midplane Fluxes in Tests*

| Test Position | Fast Flux n/cm.²-sec. ×10⁻¹⁵ | Thermal Flux n/cm.²-sec. ×10⁻¹⁵ | Fast to Thermal Flux Ratio |
|---|---|---|---|
| Center [1] | 2.1 | 0.61 | 3.5 |
| Outer [2] | 1.3 | 0.44 | 3.0 |
| Exterior [2] | 1.6 | 0.56 | 2.9 |
| Outer [3] | 1.3 | 0.66 | 2.0 |

[1] 30% light water and 70% Al in flux trap region.
[2] 40% light water and 60% Al in flux trap region.
[3] Light water in flux trap region.

The control system of this reactor not only compensates for changes in reactivity from fuel burnup, fission product formation and consumption of burnable poison, but also maintains the proper power distribution among the core lobes through the fuel cycle.

The length of time that this reactor can operate at full power before refueling, the cycle time, is limited by the ability to hold the required core power and test flux distribution, rather than by loss of criticality. The loss of control over the power distribution after about 17 days, which sets the limit on the cycle time, occurs because all of the poison has been removed from the necks. If the change in power distribution and test fluxes after 17 days is permissible then the reactor can operate at full power for about 31 days before it is necessary to refuel. After 17 days of full power operation the average burnup of fuel in the core is 20% and after 31 days it is 36%.

The loose coupling between lobes in this reactor introduces the property that a perturbation in the operating conditions of one lobe can cause a shift of power from lobe to lobe. The herein-described control system is capable of holding deviations from the desired power levels within acceptable limits.

The ability of the control system to maintain the required power distribution after shutdown from full power is illustrated by the following. After 200 hours of operation at 250 mw. the reactor is shut down to 2.5 mw. for one-half hour and then returned to full power. The difference in the power densities of the lobes causes the loss of reactivity from nonequilibrium xenon formation after shutdown and subsequent return to full power to tend to decrease the power in the lobe where the highest power is desired (the center lobe) and to increase it where the lower powers are wanted. Thus after return to full power it is necessary to exert all available shim control in the control tanks in order to shift the power as far as possible from the outer lobes into the center lobe. Then, as the burnup of the nonequilibrium xenon proceeds, more control becomes available and it again becomes possible to obtain the desired power balance between lobes by use of all control regions. The desired power balance is obtained within one-half hour after return to full power. Immediately after startup the worst power deviation occurs with the center lobe being 14% lower than desired and each of the outer lobe powers being 4% higher than desired. After burnup of the nonequilibrium xenon is complete, the xenon concentration will be at a lower value than when the reactor was shut down and more excess reactivity is available than at shutdown.

The following table gives in tabular form the parameters of the specific reactor which has heretofore been discussed.

| | |
|---|---|
| Core height | 48 in. |
| Core thickness | 2.5 in. |
| Core volume | 262 liters. |
| Core metal-to-water ratio (volume) | 0.8. |
| Core structural material and cladding | Aluminum-nickel alloy. |
| Fuel | 93% enrich U-235. |
| Fuel loading | 33 kg. U-235. |
| Control requirements: | |
|    Safety blades | 10.0% $\Delta k/k$. |
|    Neck shims | 2.9% $\Delta k/k$. |
|    Reflector shims | 6.5% $\Delta k/k$. |
|    Burnable poison | 4.8% $\Delta k/k$. |
| Core power | 250 mw. |
| Maximum power density | 2.5 mw./liter. |
| Vertical maximum-to-average power ratio | 1.4 or less. |
| Cycle time at full power | 17 days. |
| Coolant velocity through fuel | 44 ft./sec. |
| Operating pressure | 300 p.s.i.g. |

It will be understood that this invention is not to be limited to the details given herein but that it may be modified within the scope of the appended claims.

What is claimed is:

1. A thermal nuclear reactor containing a moderator comprising a core consisting of a plurality of fuel elements arranged in multileaf configuration in which the fuel elements in each leaf are arranged in a smooth curve forming more than a 180-degree segment of a circle and the leaves are joined by fuel elements forming a segment of a circle and including a pressure tube forming an experimental loop centered in each leaf of the core.

2. A thermal nuclear reactor containing a moderator comprising a core consisting of a plurality of fuel elements arranged in the form of a quatrefoil in which the fuel elements in each lobe of the quatrefoil are arranged in a smooth curve forming more than a 180-degree segment of a circle and the lobes of the quatrefoil are joined by fuel elements forming a 180° segment of a circle and including a pressure tube forming an experimental loop centered in each lobe of the quatrefoil, at the center of the quatrefoil, and between each pair of lobes of the quatrefoil.

3. A nuclear reactor according to claim 2 in which the fuel elements have cross sections which are segments of a circle.

4. A nuclear reactor according to claim 3 and including arcuate control tanks containing a solution of a material having a high capture cross section for thermal neutrons disposed about the outside of each lobe of the quatrefoil.

5. A nuclear reactor according to claim 4 and including control tubes containing a solution of a material having a high capture cross section for thermal neutrons disposed in the neck of each lobe of the quatrefoil.

6. A nuclear reactor according to claim 5 and including a safety control element disposed transversely to the neck of each lobe of the quatrefoil.

7. A nuclear reactor according to claim 6 wherein the safety control element consists of a blade extending between the midpoints of arcuate extensions, which extensions are disposed in an arc along the outside edge of the quatrefoil.

8. A thermal nuclear reactor containing a moderator comprising a pressure vessel, a reactor core in said pressure vessel consisting of a plurality of fuel elements which have cross sections which are segments of a circle arranged in the form of a quatrefoil in which the fuel elements in each lobe of the quatrefoil are arranged in a smooth curve forming more than a 180-degree segment of a circle and the lobes of the quatrefoil are joined by fuel elements forming a 180° segment of a circle, arcuate control tanks containing a solution of boric acid in light water disposed about the outside of each lobe of the quatrefoil, control tubes containing a solution of boric acid in light water disposed in the neck of each lobe of the quatrefoil, a safety control element consisting of a blade extending across the neck of each lobe of the quatrefoil and arcuate extensions attached at the end thereof and disposed in an arc along the outside edge of the quatrefoil, a pressure tube forming an experimental loop centered in each lobe of the quatrefoil, at the center of the quatrefoil, and between each pair of lobes of the quatrefoil, and a reflector tank containing heavy water as reflector disposed in the pressure vessel about the reactor core.

9. A thermal nuclear reactor containing a moderator comprising a pressure vessel, a reactor core in said pressure vessel consisting of a plurality of fuel elements which have cross sections which are segments of a circle arranged in the form of a quatrefoil in which the fuel elements in each lobe of the quatrefoil are arranged in a smooth curve forming more than a 180-degree segment of a circle and the lobes of the quatrefoil are joined by fuel elements forming a 180° segment of a circle, arcuate control tanks containing a solution of a material having a high capture cross section for thermal neutrons disposed about the outside of each lobe of the quatrefoil, control tubes containing a solution of a material having a high capture cross section for thermal neutrons disposed in the neck of each lobe of the quatrefoil, a safety control element consisting of a blade extending across the neck of each lobe of the quatrefoil and arcuate extensions at the end thereof and disposed in an arc along the outside edge of the quatrefoil, a pressure tube forming an experimental loop centered in each lobe of the quatrefoil, at the center of the quatrefoil, and between each pair of lobes of the quatrefoil, and a reflector tank containing a moderator disposed in the pressure vessel about the reactor core.

References Cited in the file of this patent

UNITED STATES PATENTS

| | | |
|---|---|---|
| 2,735,811 | Weinberg et al. | Feb. 21, 1956 |
| 2,921,007 | Spinrad | Jan. 12, 1960 |

FOREIGN PATENTS

| | | |
|---|---|---|
| 611,879 | Canada | Jan. 3, 1961 |
| 1,082,991 | Germany | June 9, 1960 |

OTHER REFERENCES

AEC Document, IDO–16666, Mar. 17, 1960, pp. 14–16, 19, 20 and 44.

AEC Document, IDO–16667, Nov. 1, 1960, pp. 16–19 and 60.